United States Patent
Clemen, Jr.

(10) Patent No.: US 11,243,443 B2
(45) Date of Patent: Feb. 8, 2022

(54) ELECTRIC IRIS

(71) Applicant: The Boeing Company, Chicago, IL (US)

(72) Inventor: Mark Joseph Clemen, Jr., Port Orchard, WA (US)

(73) Assignee: The Boeing Company, Chicago, IL (US)

( * ) Notice: Subject to any disclaimer, the term of this patent is extended or adjusted under 35 U.S.C. 154(b) by 1 day.

(21) Appl. No.: 16/843,034

(22) Filed: Apr. 8, 2020

(65) Prior Publication Data
US 2021/0318569 A1    Oct. 14, 2021

(51) Int. Cl.
| | | |
|---|---|---|
| *G02F 1/1347* | (2006.01) |
| *C09K 19/00* | (2006.01) |
| *G02B 5/30* | (2006.01) |
| *G02F 1/1335* | (2006.01) |
| *G02F 1/139* | (2006.01) |
| *H04N 5/225* | (2006.01) |

(52) U.S. Cl.
CPC .......... *G02F 1/13471* (2013.01); *C09K 19/00* (2013.01); *G02B 5/3016* (2013.01); *G02F 1/139* (2013.01); *G02F 1/133528* (2013.01); *H04N 5/2254* (2013.01)

(58) Field of Classification Search
CPC .......... G02F 1/13471; G02F 1/133528; G02F 1/139; C09K 19/00; G02B 5/3016; H04N 5/2254
USPC .............................................. 349/11, 13, 95
See application file for complete search history.

(56) References Cited

U.S. PATENT DOCUMENTS

| | | |
|---|---|---|
| 4,978,182 A | 12/1990 | Tedesco |
| 5,831,769 A | 11/1998 | Smith |
| 6,652,778 B1 | 11/2003 | Twarowski |
| 7,202,852 B2 | 4/2007 | Harvie |
| 7,344,260 B2 | 3/2008 | Derenski |
| 9,285,646 B2 | 3/2016 | Wang et al. |
| 9,415,745 B1 | 8/2016 | Clemen, Jr. et al. |
| 9,835,914 B2 | 12/2017 | Clemen, Jr. et al. |
| 2003/0103713 A1 | 6/2003 | Pan et al. |
| 2005/0007505 A1 | 1/2005 | Faris et al. |
| 2005/0185135 A1 | 8/2005 | Blum et al. |
| 2009/0279050 A1* | 11/2009 | McGinn ................. G02C 7/101 351/159.47 |
| 2014/0152944 A1 | 6/2014 | Zhao |

(Continued)

FOREIGN PATENT DOCUMENTS

CN    110873989 A    3/2020

OTHER PUBLICATIONS

European Patent Office Extended Search Report, dated Sep. 2, 2021, regarding Application No. EP21166896.7, 8 pages.

*Primary Examiner* — Charles S Chang
(74) *Attorney, Agent, or Firm* — Yee & Associates, P.C.

(57) ABSTRACT

An optical system with an electronically variable iris. The optical system comprises an optical lens. A number of transparent conductive layers is coupled to an optical surface of the optical lens. A liquid crystal film is separated into a number of portions by the number of transparent conductive layers, wherein a transmissive state of each portion, from the number of portions of the liquid crystal film, with respect to light is configured to change in response to application of a voltage to the number of transparent conductive layers.

20 Claims, 6 Drawing Sheets

(56) References Cited

U.S. PATENT DOCUMENTS

2016/0062141 A1\* 3/2016 De Sio ................ G02F 1/13306
                                                    349/13
2018/0252944 A1   9/2018 Pugh et al.
2021/0015604 A1\* 1/2021 Ma ........................ G02F 1/0121

\* cited by examiner

ELECTRIC IRIS

CROSS-REFERENCE TO RELATED APPLICATIONS

This application is related to U.S. Pat. No. 9,415,745, issued on Aug. 16, 2016 and U.S. Pat. No. 9,835,914, issued on Dec. 5, 2017. Both patents are incorporated by reference herein in their entirety.

BACKGROUND INFORMATION

1. Field

The present disclosure relates generally to electrical f-stops for an optical lens, and in particular, to an electrically controlled iris which operates without motion or vibration to protect image sensors from sudden bright lights or lasers.

2. Background

High intensity light sources such as lasers can damage an image sensor of an optical system such as a video camera or still image camera. At their most basic, optical systems or cameras are sealed boxes with a small hole or aperture that lets light in to capture an image on a light-sensitive surface such as photographic film or a digital image sensor.

Optical systems have various mechanisms to control how the light falls onto the light-sensitive surface. Optical lenses focus the light entering the box, the size of the aperture can be widened or narrowed to let more or less light into the camera, and a shutter mechanism determines the amount of time the photo-sensitive surface is exposed to the light coming through the aperture. The aperture or iris is the opening through which light enters the camera. This opening can be widened or narrowed to control the amount of light that strikes the photo-sensitive surface.

The iris is typically mechanically operated by the movements of overlapping plates or blades that rotate together and apart to shrink and expand the hole at the center. The mechanical iris requires a motor, however small, that may introduce vibration. The diameter of the aperture can be set manually or automatically based on calculations influenced by an internal light meter.

The iris adjusts the size of the opening usually at standard increments, typically called "f-stops" that usually range from f/1.4 to f/32 in standard increments: 1.4, 2, 2.8, 4, 5.6, 8, 11, 16, 22, and 32. As the numbers increase, each increment or "stop" halves the amount of light entering the optical system. Conversely, the lower the number, the larger the opening, and so the more light that is let into the optical system. Movement of these mechanical plates, along with the motor that drives them, may cause vibration which may affect the accuracy of the image sensor. Additionally, the mechanical movement may produce unwanted delay in adjusting the amount of light reaching the optical image sensor.

Therefore, it would be desirable to have a method and apparatus that take into account at least some of the issues discussed above, as well as other possible issues. For example, it would be desirable to have a method and apparatus that provides for detecting high intensity light and automatically minimizing the amount of the detected light that reaches an optical image sensor to a safe level to protect the sensor and still allow the sensor to capture images. It would also be desirable to be able to adjust the amount of detected light reaching the image sensor electronically by adjusting the size of the aperture using an iris without moving parts that cause motion and vibration.

SUMMARY

An example of the present disclosure provides an apparatus comprising an optical lens. A number of transparent conductive layers is coupled to an optical surface of the optical lens. A liquid crystal film is separated into a number of portions by the number of transparent conductive layers. A transmissive state of each portion from the number of portions of the liquid crystal film with respect to light is configured to change in response to application of a voltage to the number of transparent conductive layers.

Another example of the present disclosure provides an optical system comprising an optical lens. A number of transparent conductive layers is coupled to an optical surface of the optical lens. A liquid crystal film is separated into a number of portions by the number of transparent conductive layers. A transmissive state of each portion from the number of portions of the liquid crystal film with respect to light is configured to change in response to application of a voltage to the number of transparent conductive layers. A controller is configured to selectively apply the voltage to change the transmissive state of one or more portions from the number of portions of the liquid crystal film between transparent and reflective to thereby change an amount of light passing through the optical lens to an image sensor.

Yet another example of the present disclosure provides a method for automatically adjusting a level of light reaching an optical lens with an electric iris comprising sensing a level of light at the optical lens and if the level of light exceeds a threshold, passing a voltage to at least one transparent conductive layer from a number of transparent conductive layers sufficient to change a transmissive state of a portion of a liquid crystal film corresponding to the at least one transparent conductive layer from the number of transparent conductive layers, wherein the portion of the liquid crystal film, when in a reflective transmissive state, blocks a corresponding portion of an optical surface of the optical lens from incoming light The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that it would be desirable to alter the size of the aperture of an optical system quicker than what is typically provided by a mechanical iris. Further it would be desirable to alter the size of the aperture of an optical system automatically upon the detection of high-intensity light that would damage an optical image sensor if such high-intensity light were to reach the optical image sensor unhindered.

The illustrative examples recognize and take into account that it would be desirable to electronically alter the size of the aperture of an optical system to remove the motion and vibration caused by a typical mechanical iris.

Thus, the illustrative examples provide an electrically variable iris for an optical system that operates to reduce or increase the aperture of the optical system in a fraction of the time of a typical mechanical iris.

Figure 1:
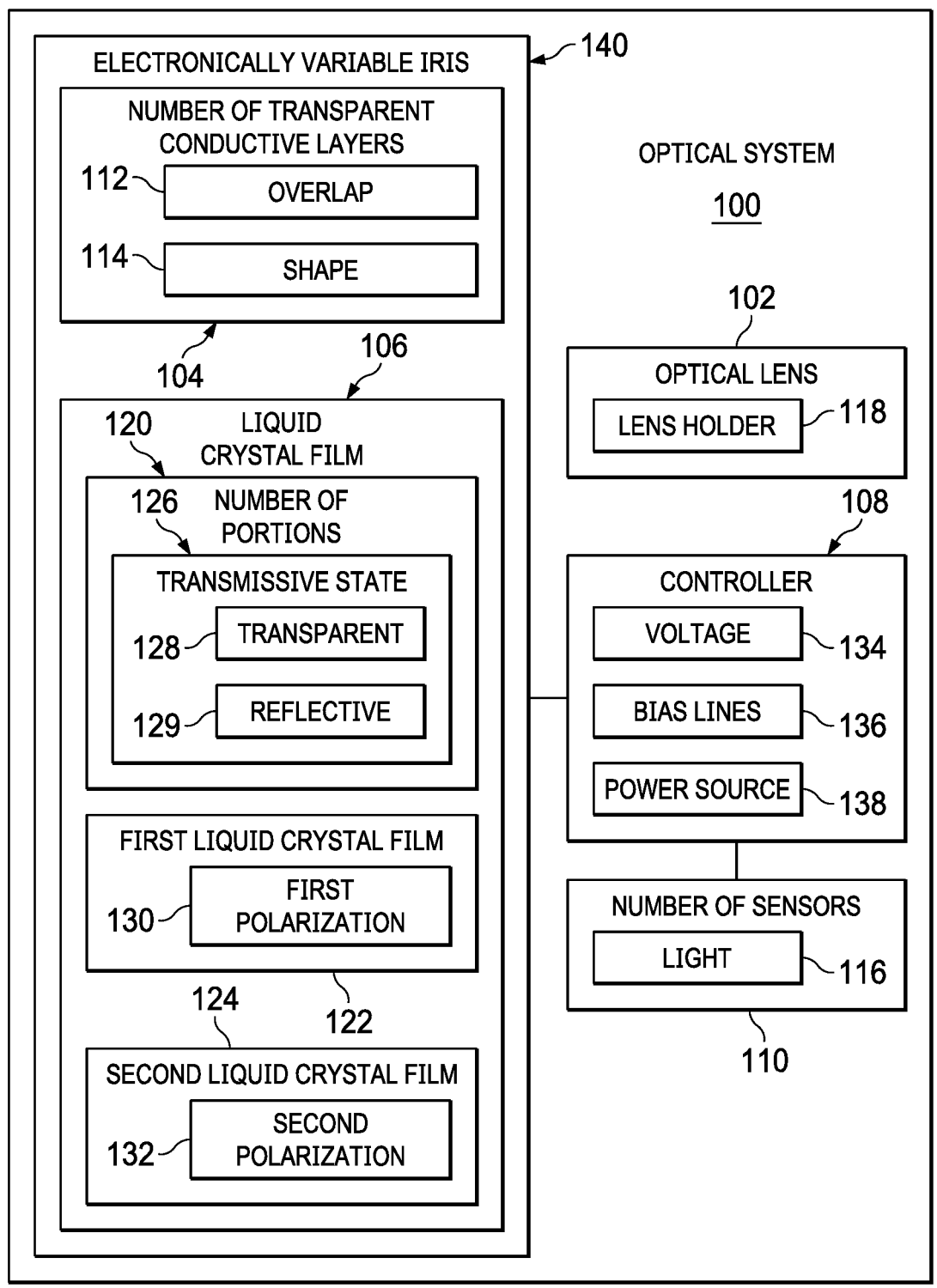
FIG. 1 is an illustration of an optical system in the form of a block diagram in accordance with an illustrative example.

Turning now to FIG. 1, an illustration of a block diagram of an optical system is depicted in accordance with an illustrative example. Optical system 100 includes optical lens 102, electronically variable iris 140, controller 108, and a number of sensors 110.

In the illustrative example, optical lens 102 may be a single lens or a collection of lenses arranged to focus light on an image sensor. Lens 102 may be secured in lens holder 118. Lens holder 118 may be secured to a camera body or any fixed position such as an aircraft frame or skin.

Electronically variable iris 140 is connected to optical lens 102. As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As used herein, the phrase "at least one of," when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Electronically variable iris 140 includes number of transparent conductive layers 104. As used herein, a "number of," when used with reference to items, means one or more items. For example, number of transparent conductive layers 104 is one or more transparent conductive layers 104. Any transparent conductive layer from number of transparent conductive layers 104 may overlap 112 with any other transparent conductive layer from number of transparent conductive layers 104. Overlap 112 may be a portion or an edge of a transparent conductive layer from number of transparent conductive layers 104 overlapping a portion or an edge of another transparent conductive layer from number of transparent conductive layers 104. Overlap 112 may be the entirety of a transparent conductive layer from number of transparent conductive layers 104 overlapping a portion or the entirety of another transparent conductive layer from number of transparent conductive layers 104.

Number of transparent conductive layers 104 are thin films of optically transparent and electrically conductive materials such as indium tin oxide (ITO), transparent conductive oxides (TCOs), conductive polymers, metal grids, metallic networks, carbon nanotubes (CNT), graphene, nanowire meshes, and ultra-thin metal films.

Number of transparent conductive layers 104 has shape 114. Shape 114 can include for example rings, triangles, pie-shapes, and polygons.

Electronically variable iris 140 includes liquid crystal film 106. At least one transparent conductive layer from number of transparent conductive layers 104 is associated with liquid crystal film 106. Liquid crystal film 106 may be one or more layers of liquid crystal film. Liquid crystal film 106 may be manufactured of materials such as cholesteric liquid crystals and nematic liquid crystals.

Liquid crystal film 106 is separated into number of portions 120 by number of transparent conductive layers 104. Each portion of number of portions 120 has transmissive state 126 including transparent 128 and reflective 129. A transparent 128 transmissive state 126 allows light to pass through liquid crystal film 106. A reflective 129 transmissive state 126 is mirror-like, reflecting light from liquid crystal film 106, and thus blocks light from passing through. Reflective 129 transmissive state 126 is a specular reflection or mirror-like reflection of waves, such as light, from a surface. Each incident ray is reflected at the same angle to the surface normal as the incident ray, but on the opposing side of the surface normal in the plane formed by incident and reflected rays. The result is that an image reflected by the surface is reproduced in mirror-like (specular) fashion.

Liquid crystal film 106 is respectively tailored for left-handed or right-handed polarization, meaning that liquid crystal film 106 passes one polarization or the other. When unbiased, i.e., no applied voltage, liquid crystal film 106 is 50% transparent as it removes the other half of polarized light. When liquid crystal film 106 includes two stacked layers, one left-handed polarization and one right-handed polarization, and if no voltage is applied, liquid crystal film 106 blocks all light. When voltage is applied via number of transparent conductive layers 104, liquid crystal film 106 may become transparent. Accordingly, liquid crystal film 106 may include first liquid crystal film 122 having first polarization 130. Liquid crystal film 106 may also include second liquid crystal film 124 having second polarization 132.

Optical system 100 includes controller 108. Controller 108 is configured to selectively apply voltage 134 from power source 138 via bias lines 136 connected to number of transparent conductive layers 104 to change transmissive state 126 of one or more portions from number of portions 120 of liquid crystal film 106 between transparent 128 and reflective 129 to thereby change an amount of light passing through optical lens 102 to an image sensor. Controller 108 may be implemented in at least one of hardware or software. Controller 108 may be a processor unit in a computer system or a specialist circuit depending on the particular implementation.

Optical system 100 includes number of sensors 110. Number of sensors 110 is in electrical communication with controller 108. Number of sensors 110 is configured to assess a level of light reaching the optical lens. Controller 108 is configured to automatically select which portions from number of portions 120 of liquid crystal film 106 have their transmissive state 126 changed based on the level of light 116 assessed by number of sensors 110. In operation, electrically variable iris 140 switches each portion from number of portions 120 between visually transparent 128 and visually reflective 129, or mirror-like (blocking light), in successively smaller apertures to create electrical f-stops for optical system 100.

The illustration of optical system 100 and the different components in FIG. 1 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

Figure 2:
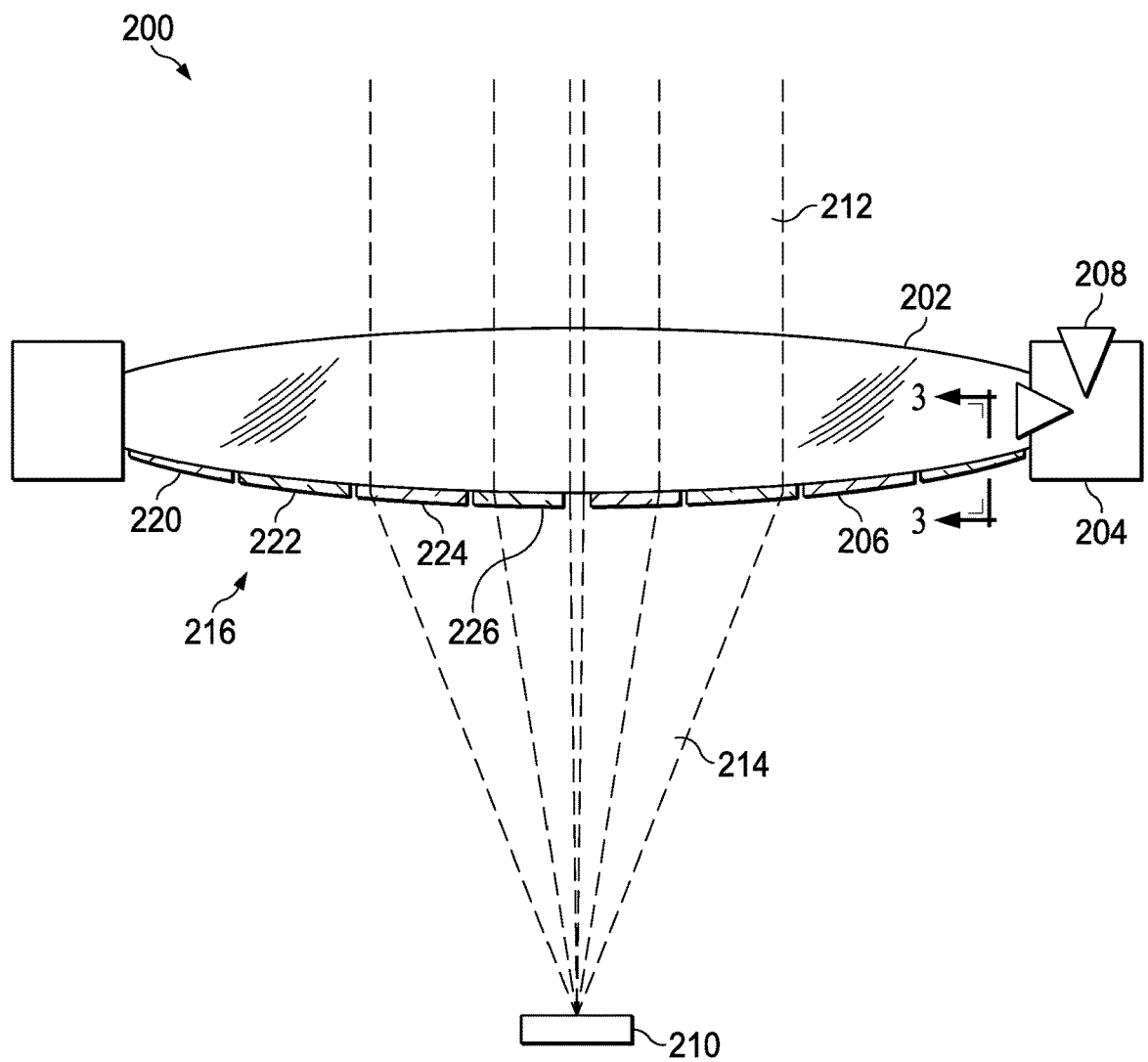
FIG. 2 is an illustration of an optical system in accordance with an illustrative example.

With reference now to FIG. 2, illustration of optical system 200 is depicted in accordance with an illustrative example. As depicted, optical system 200 is an example of one implementation for optical system 100 in FIG. 1.

As depicted, optical system 200 includes optical lens 202 secured in lens holder 204. Electronically variable iris 206 is coupled to optical lens 202. Electronically variable iris 206 includes number of portions 216 separated by transparent conductive layers 220, 222, 224, and 226. Number of sensors 208 is in electrical communication with a controller. Number of sensors 208 is configured to assess a level of light 212 reaching optical lens 202. The controller uses the assessed level of light 212 to automatically select which portions from number of portions 216 have their transmissive state changed. The transmissive state of each portion from number of portions 216 is changed between transparent and reflective by applying or removing a voltage via transparent conductive layers 220, 222, 224, and 226. Accordingly, electronically variable iris 206 alters an aperture and reduces the amount of light 212 that passes through optical lens 202 such that only stepped-down light 214 reaches image sensor 210.

Figure 3:
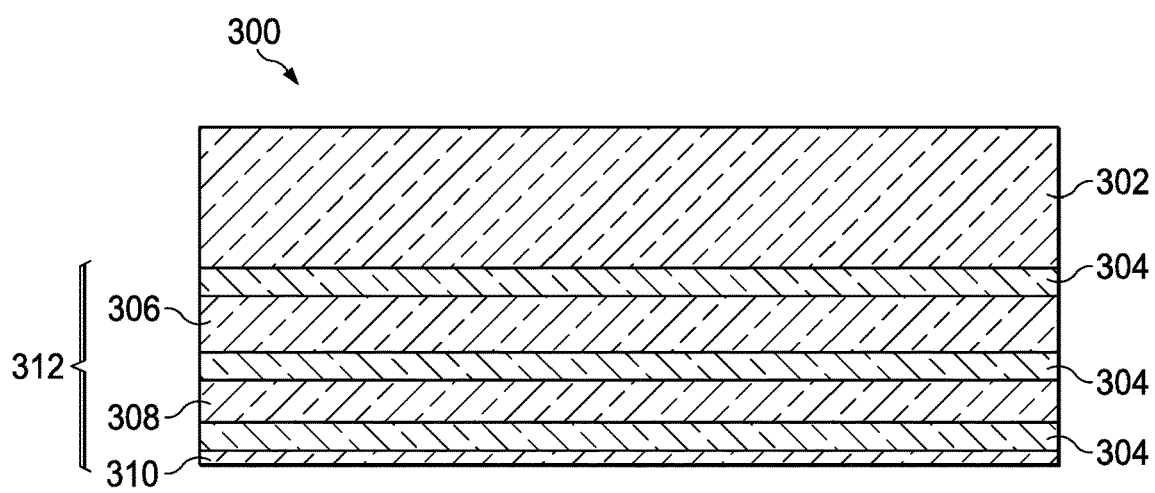
FIG. 3 is an illustration of an optical system in accordance with an illustrative example.

With reference now to FIG. 3, illustration of optical system 300 is depicted in accordance with an illustrative example. FIG. 3 is a sectional view along line 3-3 of FIG. 2 of an electronically variable iris coupled to an optical lens. As depicted, optical system 300 is an example of one implementation for optical system 100 in FIG. 1 and optical system 200 in FIG. 2.

As depicted, optical system 300 includes optical lens 302. Electronically variable iris 312 is coupled to optical lens 302. Electronically variable iris 312 includes transparent conductive layers 304. At least one transparent conductive layer 304 is associated with liquid crystal film 306. At least one other transparent conductive layer 304 is associated with liquid crystal film 308. Liquid crystal film 306 may be "sandwiched" between two separate transparent conductive layers 304. Accordingly, liquid crystal film 308 may be "sandwiched" between two separate transparent conductive layers 304. Optical system 300 may include additional optical lenses 302 within variable iris 312 and positioned between liquid crystal film 306 and liquid crystal film 308. Liquid crystal film 306 has opposite polarization than liquid crystal film 308. For example, liquid crystal film 306 may be right-handed polarization and liquid crystal film 308 may be left-handed polarization or vice-versa. Electronically variable iris 312 may include polymer protective layer 310.

Figure 4:
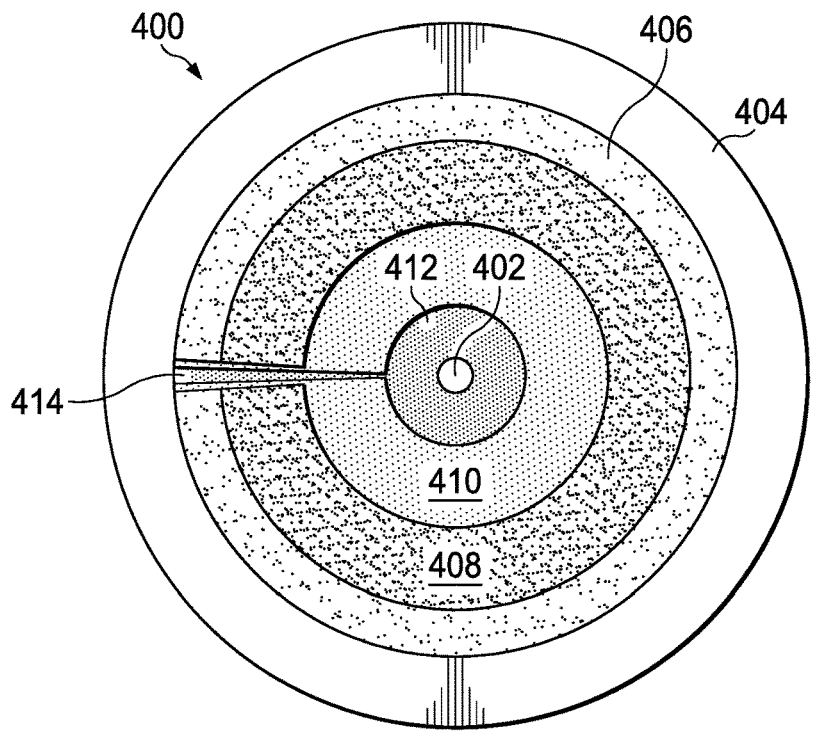
FIG. 4 is an illustration of an electrically variable iris in accordance with an illustrative example.
Figure 5:
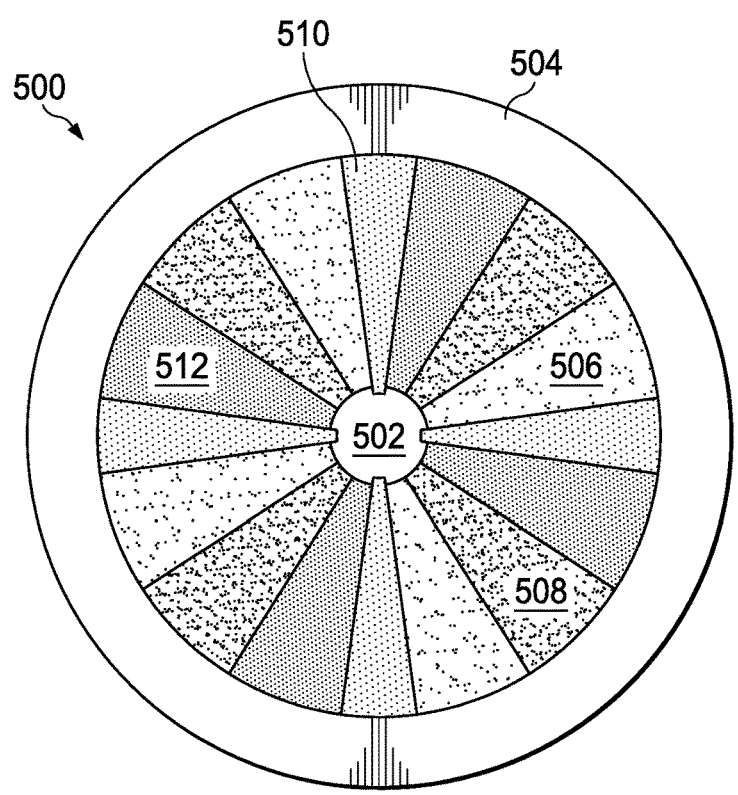
FIG. 5 is an illustration of an electrically variable iris in accordance with an illustrative example.
Figure 6:
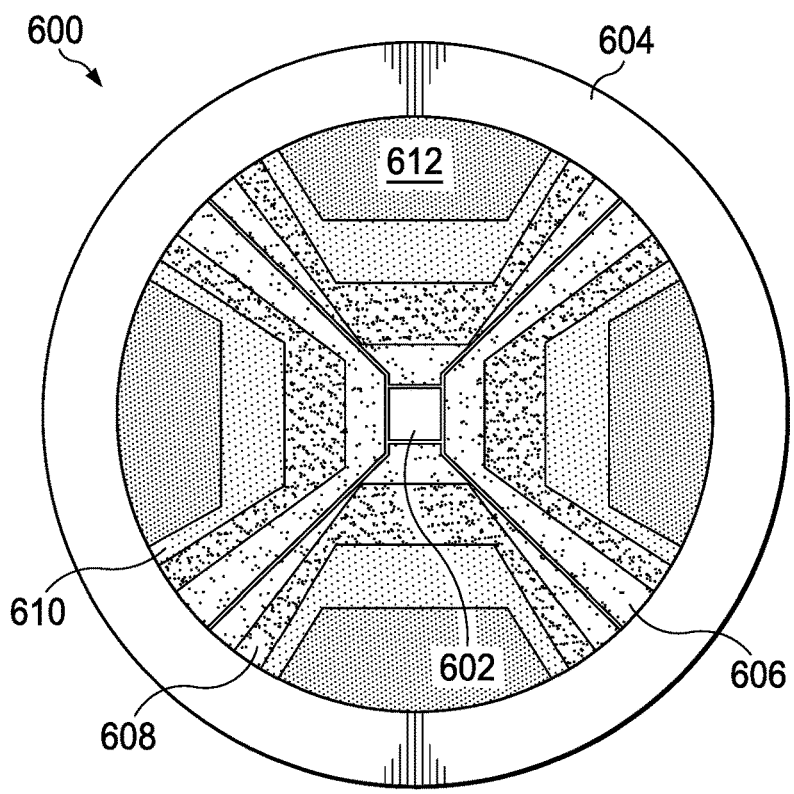
FIG. 6 is an illustration of an electrically variable iris in accordance with an illustrative example.

With reference now to FIGS. 4-6, illustration of an electrically variable iris is depicted in accordance with an illustrative example. As depicted, electronically variable iris 400, 500, and 600 are examples of implementations for electronically variable iris 140 in FIG. 1 and electronically variable iris 206 in FIG. 2 and electronically variable iris 312 in FIG. 3.

As depicted in FIG. 4, lens holder 404 secures an optical lens (not shown). Number of transparent conductive layers 406, 408, 410, and 412 are associated with portions of liquid crystal film coupled to the optical lens. Number of transparent conductive layers 406, 408, 410, and 412 are ring-shaped and define aperture 402. Each transparent conductive layer from number of transparent conductive layers 406, 408, 410, and 412 may overlap each other at a portion of another or along an edge of another transparent conductive layer. Each transparent conductive layer from number of transparent conductive layers 406, 408, 410, and 412 may not overlap any other transparent conductive layer at all. Bias lines 414 connect number of transparent conductive layers 406, 408, 410, and 412 to a power source. Bias lines 414 transmit a voltage from a power source to transparent conductive layers 406, 408, 410, and 412. A controller determines which transparent conductive layers of transparent conductive layers 406, 408, 410, and 412 receive or no longer receive the voltage based on light assessed by a sensor. The transmissive state of each portion of liquid crystal film associated with each transparent conductive layer from transparent conductive layers 406, 408, 410, and 412 will change in response to the application or removal of voltage determined by the controller.

As depicted in FIG. 5, lens holder 504 secures an optical lens (not shown). Number of transparent conductive layers 506, 508, 510, and 512 are associated with portions of liquid crystal film coupled to the optical lens. Number of transparent conductive layers 506, 508, 510, and 512 are pie-shaped and define aperture 502. The operation of number of transparent conductive layers 506, 508, 510, and 512 is as previously described in relation to transparent conductive layers 406, 408, 410, and 412.

As depicted in FIG. 6, lens holder 604 secures an optical lens (not shown). Number of transparent conductive layers 606, 608, 610, and 612 are associated with portions of liquid crystal film coupled to the optical lens. Number of transparent conductive layers 606, 608, 610, and 612 are polygonal-shaped and define aperture 602. The operation of number of transparent conductive layers 606, 608, 610, and 612 is as previously described in relation to transparent conductive layers 406, 408, 410, and 412.

The illustrations of the components of optical system 100 in FIGS. 3-6 are provided for the purpose of showing different physical implementations for optical system 100 shown in block form in FIG. 1. These illustrations are not meant to limit the manner in which other illustrative examples may be implemented.

Figure 7:
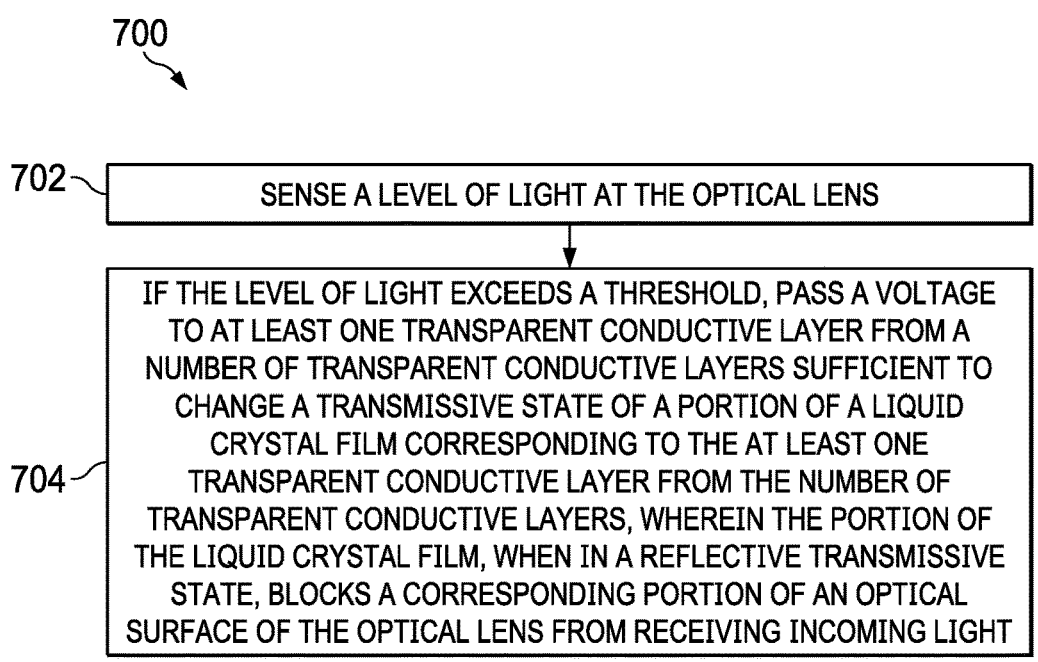
FIG. 7 illustrates a method of electronically adjusting the size of an aperture of an optical system in accordance with an illustrative example.

Turning next to FIG. 7, an illustration of a flowchart of a process 700 for electronically varying an aperture of an optical system in accordance with an illustrative example. The process illustrated may be implemented with optical system 100 in FIG. 1.

Process 700 begins by sensing a level of light at the optical lens (operation 702). Too much light sensed requires the optical system to limit the amount of light that reaches an image sensor.

Next, if the level of light exceeds a threshold, pass a voltage to at least one transparent conductive layer from a number of transparent conductive layers sufficient to change a transmissive state of a portion of a liquid crystal film corresponding to the at least one transparent conductive layer from the number of transparent conductive layers, wherein the portion of the liquid crystal film, when in a reflective transmissive state, blocks a corresponding portion of an optical surface of the optical lens from receiving incoming light (operation 704).

The operations described above are not relegated to the order the operations were presented. Some operations can be performed prior to previously described operations and some can be performed simultaneously. The order the operations were presented does not imply an order for the operations to be performed in.

Figure 8:
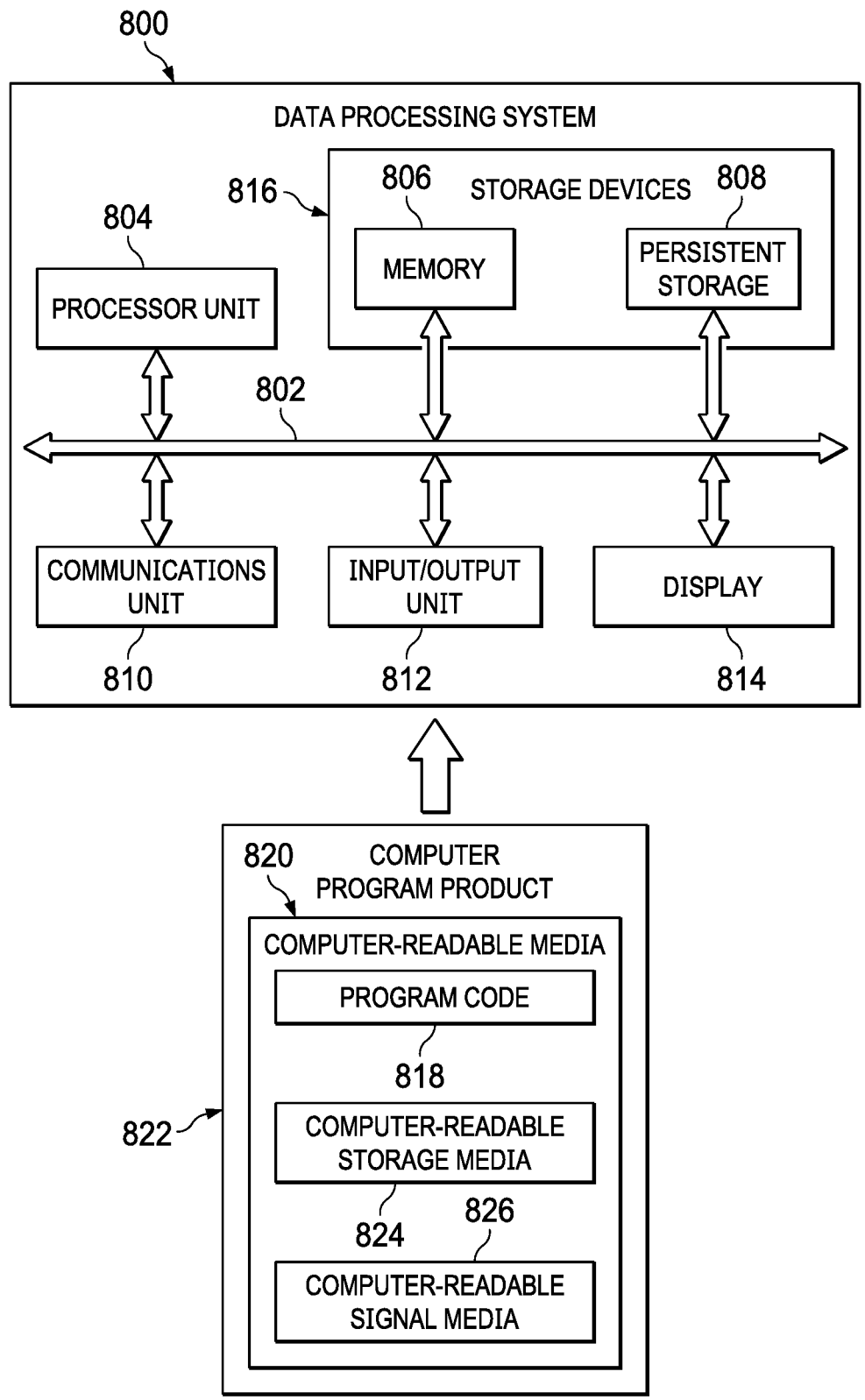
FIG. 8 is an illustration of a data processing system in a form of a block diagram in accordance with an illustrative example.

Turning now to FIG. 8, an illustration of a data processing system in a form of a block diagram is depicted in accordance with an illustrative embodiment. Data processing system 800 may be used to implement controller 108 of FIG. 1.

In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and other suitable information either on a temporary basis or a permanent basis. Storage devices 816 also may be referred to as computer-readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for direct user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may be computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is a media that can be touched by a person.

Alternatively, program code 818 may be transferred to data processing system 800 using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field-programmable logic array, a field-programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in communications fabric 802.

Figure 9:
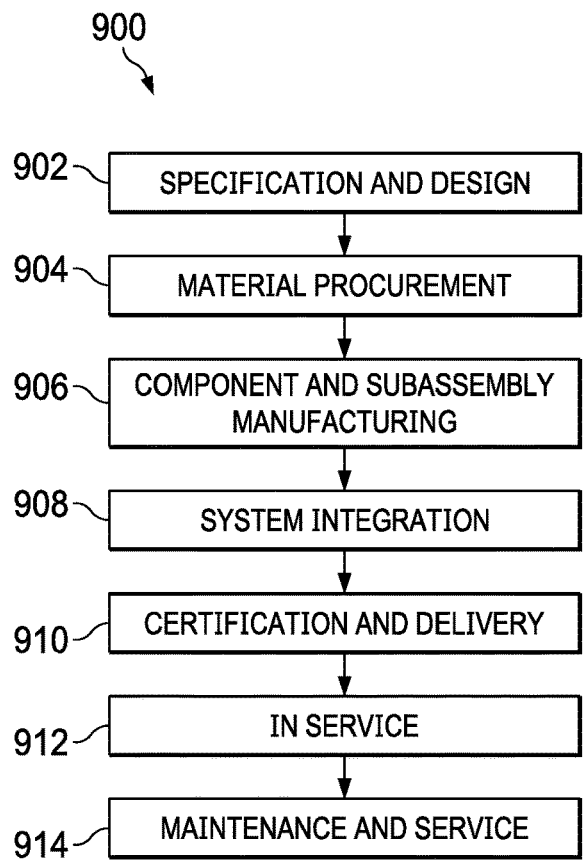
FIG. 9 is an illustration of an aircraft manufacturing and service method in accordance with an illustrative example.
Figure 10:
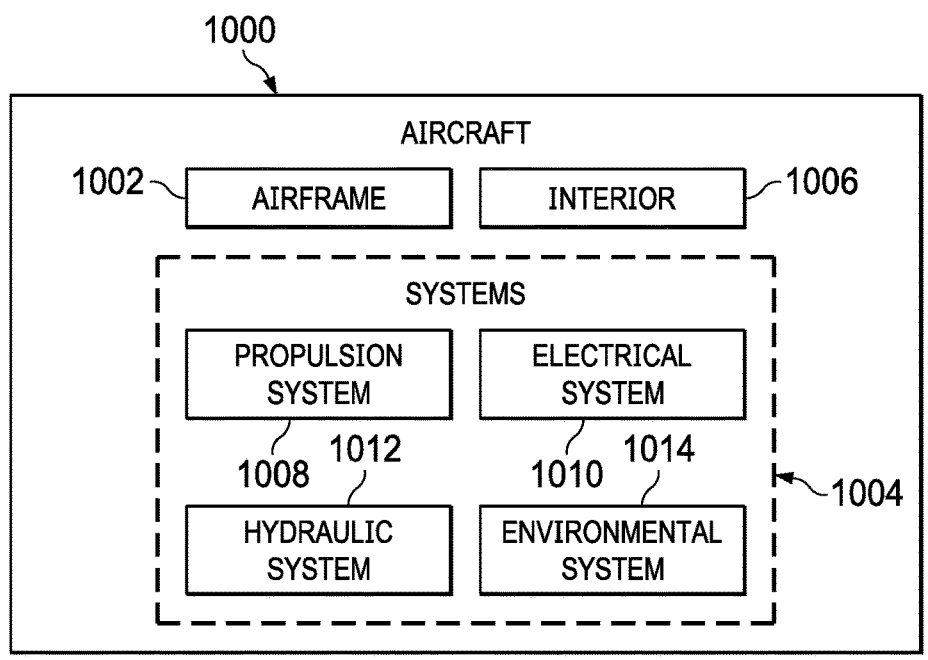
FIG. 10 is an illustration of an aircraft in which an illustrative example may be implemented.

The illustrative examples of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative example. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 take place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative example may be implemented. In this example, aircraft 1000 may include airframe 1002 with a plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative examples may be applied to other industries, such as the automotive industry. The apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus examples, method examples, or a combination thereof may be utilized during production stages, such as component and subassembly manufacturing 906 and system integration 908 in FIG. 9. One or more apparatus examples, method examples, or a combination thereof may be utilized while aircraft 1000 is in service 912, during maintenance and service 914 in FIG. 9, or both. For example, the optical system may be used during maintenance and service 914 to reduce clearances within aircraft 1000.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An apparatus, comprising:
an optical lens;
a number of transparent conductive layers coupled to an optical surface of the optical lens; and
a first liquid crystal film having a first polarization and a second liquid crystal film having a second polarization opposite the first polarization;
wherein each liquid crystal film is separated into a number of portions by the number of transparent conductive layers, wherein a transmissive state of each portion, from the number of portions, with respect to light is configured to change in response to application of a voltage to a respective transparent conductive layer such that the number of portions form a variable shaped aperture controlled by the application of the voltage to the number of transparent conductive layers; and
wherein the first liquid crystal film is sandwiched between two separate transparent conductive layers from the number of transparent conductive layers and the second liquid crystal film is sandwiched between two separate transparent conductive layers from the number of transparent conductive layers.

2. The apparatus of claim 1, wherein an overlap between the number of transparent conductive layers is absent.

3. The apparatus of claim 1, wherein a transparent conductive layer from the number of transparent conductive layers overlaps with at least one other transparent conductive layer from the number of transparent conductive layers.

4. The apparatus of claim 1, wherein the transmissive state of each portion, from the number of portions of the liquid crystal film, is one of transparent or reflective.

5. The apparatus of claim 1, wherein each transparent conductive layer from the number of transparent conductive layers has a shape which corresponds to a respective portion from the number of portions.

6. The apparatus of claim 1, wherein each transparent conductive layer from the number of transparent conductive layers is made of a material selected from indium tin oxide, transparent conductive oxides, conductive polymers, metal grids, metallic networks, carbon nanotubes, graphene, nanowire meshes, or ultra-thin metal films.

7. The apparatus of claim 1, wherein each transparent conductive layer from the number of transparent conductive layers has a shape selected from ring, triangle, pie-shape, or polygonal.

8. The apparatus of claim 1, further comprising a number of sensors in electrical communication with the number of transparent conductive layers and configured to assess an amount of light reaching the optical lens.

9. The apparatus of claim 8, wherein the transmissive state of each portion, from the number of portions of the liquid crystal film, is configured to be automatically changed based on the amount of light assessed by the number of sensors.

10. The apparatus of claim 1, wherein the transmissive state of each portion, from the number of portions of the liquid crystal film, is configured to be manually changed with a direct user input.

11. The apparatus of claim 1, further comprising a controller operable to select one or more portions, from the number of portions of the liquid crystal film, to change the transmissive state of the selected one or more portions, from the number of portions of the liquid crystal film, to thereby change an amount of light passing through the liquid crystal film and the optical lens.

12. An optical system, comprising:
an optical lens;
a number of transparent conductive layers coupled to an optical surface of the optical lens;
a first liquid crystal film having a first polarization and a second liquid crystal film having a second polarization opposite the first polarization,
wherein each liquid crystal film is separated into a number of portions by the number of transparent conductive layers, and wherein a transmissive state of each portion, from the number of portions, with respect to light is configured to change in response to application of a voltage to a respective transparent conductive layer; and
a controller, wherein the controller is configured to selectively apply the voltage to the respective transparent conductive layer to change the transmissive state of the selected portion, from the number of portions of the liquid crystal film, between transparent and reflective to thereby change an amount of light passing through the optical lens to an image sensor;
wherein the first liquid crystal film is sandwiched between two separate transparent conductive layers from the number of transparent conductive layers and the second liquid crystal film is sandwiched between two separate transparent conductive layers from the number of transparent conductive layers.

13. The optical system of claim 12, wherein the number of transparent conductive layers form an electronically variable iris corresponding to one or more focal stops.

14. The optical system of claim 12, wherein an overlap between the number of transparent conductive layers is absent.

15. The optical system of claim 12, wherein a transparent conductive layer from the number of transparent conductive layers overlaps with at least one other transparent conductive layer from the number of transparent conductive layers.

16. The optical system of claim 12, wherein each transparent conductive layer from the number of transparent conductive layers has a shape selected from ring, triangle, pie-shape, or polygonal.

17. The optical system of claim 12, further comprising a number of sensors configured to assess a level of light reaching the optical lens, wherein the controller is further configured to automatically select which portions, from the number of portions of the liquid crystal film, have their transmissive state changed based on the level of light assessed by the number of sensors.

18. The optical system of claim 12, wherein the transmissive state of each portion from the number of portions of the liquid crystal film is configured to be manually altered with a direct user input.

19. The optical system of claim 12, wherein the optical lens is secured in a lens holder, the lens holder configured to be secured to a fixed position such as an aircraft frame or skin.

20. A method for automatically adjusting a level of light reaching an optical lens with an electric iris, the method comprising:

sensing the level of light at the optical lens; and if the level of light exceeds a threshold, passing a voltage to at least one transparent conductive layer from a number of transparent conductive layers sufficient to change a transmissive state of a portion of a liquid crystal film corresponding to the at least one transparent conductive layer from the number of transparent conductive layers, wherein the portion of the liquid crystal film, when in a reflective transmissive state, blocks a corresponding portion of an optical surface of the optical lens from incoming light;

wherein the liquid crystal film comprises a first liquid crystal film having a first polarization and a second liquid crystal film having a second polarization opposite the first polarization, and wherein the first liquid crystal film is sandwiched between two separate transparent conductive layers from the number of transparent conductive layers and the second liquid crystal film is sandwiched between two separate transparent conductive layers from the number of transparent conductive layers.

\* \* \* \* \*